United States Patent [19]

Rohrbach et al.

[11] 4,004,938

[45] Jan. 25, 1977

[54] METHOD AND APPARATUS FOR MANUFACTURING CEMENT CLINKER

[75] Inventors: Rudolf Rohrbach, Dotternhausen; Horst Ritzmann, Enniger, both of Germany

[73] Assignees: Polysius AG, Neubeckum; Rudolf Rohrbach, Dotternhausen, both of Germany

[22] Filed: Apr. 21, 1975

[21] Appl. No.: 569,832

[30] Foreign Application Priority Data

Apr. 25, 1974 Germany .......................... 2420121

[52] U.S. Cl. ................................................ 106/100
[51] Int. Cl.² .......................................... C04B 7/44
[58] Field of Search ...................................... 106/100

[56] References Cited

UNITED STATES PATENTS 1,557,873  10/1925  Pike .................................... 106/100

*Primary Examiner*—J. Poer

[57] ABSTRACT

In the manufacture of cement clinker from limestone and clay components exhaust gases from a rotary kiln are delivered via a conduit to the final stage of a multiple stage cyclone preheater for the limestone. The limestone and low grade fuel are introduced to the conduit and calcined therein by a separate firing process immediately prior to the discharge of the calcined limestone to the kiln.

11 Claims, 1 Drawing Figure

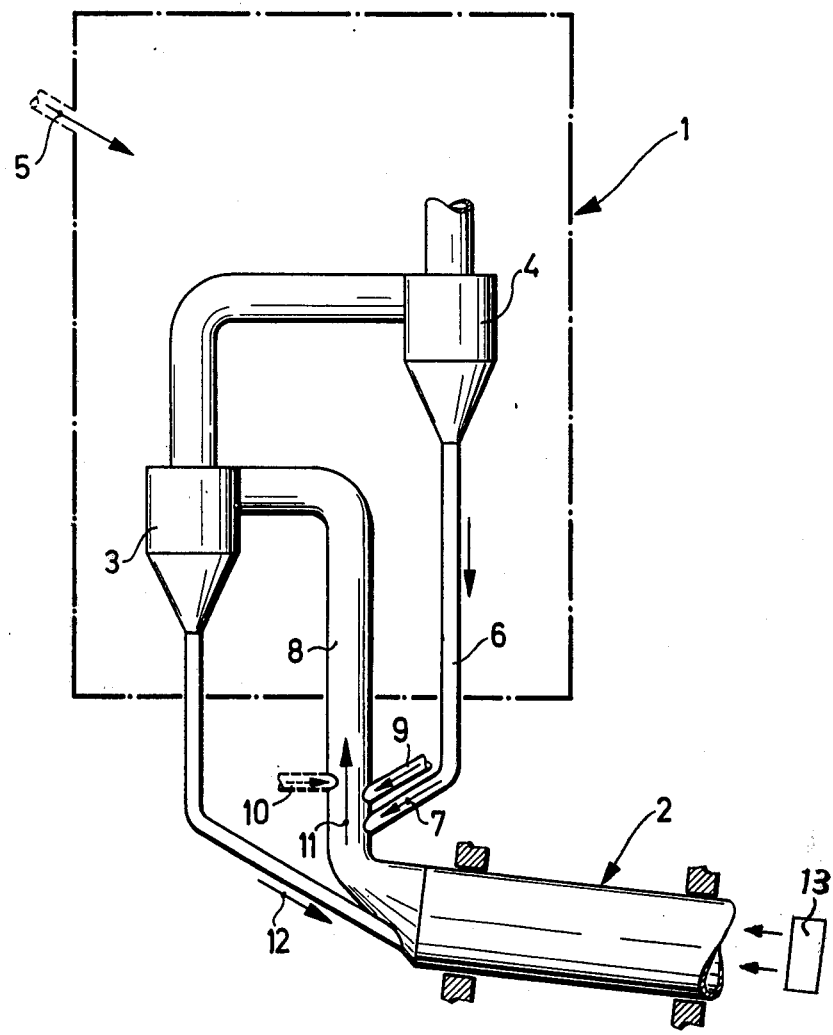

METHOD AND APPARATUS FOR MANUFACTURING CEMENT CLINKER

This invention relates to a method and apparatus for the manufacture of cement clinker from limestone and clay components, wherein ground limestone heated in a cyclone preheater is calcined in a separate firing process using oil shale or bituminous limestone as the fuel, wherein more than 30% of the heat required for the calcining is covered by complete utilization of the fuel supplied, and immediately afterwards the sintering takes place in a rotary kiln.

A process of the type described forms the subject of German Pat. No. 1,251,688. It has the particular advantage that it enables cement clinker to be made with extensive utilization of lower grade fuels.

In the embodiments described in German Pat. No. 1,251,688 the separate firing process used for calcining the ground limestone, wherein the fuel-containing components (oil shale, bituminous limestone) are used as fuel, takes place in a centrifugal furnace, to which is fed firstly the ground limestone heated in the preheater and secondly the fuel-containing components. In a cyclone following the rotary furnace, but which forms no part of the actual cycle preheater, the hot exhaust gases from the centrifugal furnace are separated from the raw ground powder.

In the embodiments described in German Pat. No. 1,251,688 the necessary combustion air must therefore be supplied separately to the centrifugal furnace. If one wishes to use warm exhaust gas from the cooler instead of cold air, the exhaust gas fan disposed after the preheater must draw in two partially parallel gas streams (i.e., the gas stream drawn through the rotary kiln and the gas stream reaching the centrifugal furnace from the cooler, which then both unite in the preheater) and this leads to difficulties with controls. If on the other hand an additional fan is placed in the gas conduit between the cooler and the centrifugal furnace to avoid this disadvantage, this fan is subject to heavy wear by the entrained clinker dust.

A further disadvantage of the plant described is finally the extra expense arising from the centrifugal furnace, the following separator, and the conduits needed.

The invention therefore has for its objective the avoidance of these disadvantages, while maintaining the basic principle disclosed in German Pat. No. 1,251,688, in further developing the method described therein to produce a particularly simple construction and a reliable mode of operating the plant.

According to the invention this objective is achieved in that the fuel-bearing components (oil shale, bituminous limestone) are fed into the conduit leading from the rotary kiln to the lowest cyclone stage of the preheater, and are burned in such conduit.

With the method provided by the invention the separate firing process, wherein the fuel-containing components are completely utilized, takes place in a part of the plant which is in any case available, i.e., the conduit leading from the rotary kiln to the preheater. As the separate firing chamber required in the known plant and also the extra separator following this firing chamber are dispensed with, this causes an appreciable simplification of the plant.

A further advantage is that with such a method the combustion air needed in the conduit between the rotary kiln and the preheater in order to burn the fuel contained in the components can be exclusively supplied through the rotary kiln, which permits very easy control of the gas stream with the aid of a single exhaust gas fan. With the method provided by the invention it is however obviously also possible when necessary for any desired fraction of the air needed in burning the fuel supply to be fed in through a separate conduit.

With the method provided by the invention the fuel-containing components are preferably fed into the lower part of the conduit leading from the rotary kiln to the preheater. The highest temperature in fact prevails in this lower area, which facilitates combustion without the need for burners. The lower the combustion zone lies in the conduit between the rotary kiln and the preheater, the less the deposits formed in the conduit and the better the degree of heat utilization (extension of the reaction section in this conduit).

The fuel-containing components and the ground limestone separated in the second stage of the preheater are according to the present method preferably introduced into the conduit leading from the rotary kiln to the first or lowest stage of the preheater in such manner that the fuel-containing components enter at a point in the gas stream at which the ground limestone is already distributed in the gas stream. This achieves very extensive direct heat transfer from the ground limestone about to be neutralized, and avoids the less favorable heat transfer via the gas.

The aim referred to above, of supplying the fuel-containing components at a point whereat the ground limestone is already distributed in the gas stream, can be achieved in various ways, taking into consideration the mode of feeding in the stream of material and the existing gas speed. The fuel-containing components can be introduced into the conduit at about the same level as the ground limestone, or somewhat higher or lower. Since the quantities of fuel-containing components represent a considerably smaller proportion as compared with the ground limestone, in general mixing is more effective if the fuel-containing components are introduced into the conduit leading from the rotary kiln to the preheater at a somewhat higher level than the ground limestone.

The grain size of the fuel-bearing components and the length of the conduit leading from the rotary kiln to the lowest cyclone stage of the preheater are preferably so related that the fuel is substantially completely burned before the material enters the lowest cyclone stage. Should part of the combustion still be taking place in this lowest cyclone stage, the heat produced thereby could be transmitted to only a small extent to the material deposited again in the cyclone stage, while much the greater part of this heat would only heat the gases.

That part of the heat needed for complete calcining of the ground limestone which is not provided by the fuel-bearing components is with the method provided by the invention preferably supplied by additional solid, liquid or gaseous fuel introduced into the conduit between the rotary kiln and the preheater. Since the amount of fuel-bearing clay components depends on the composition of such components and of the limestone, and on the desired condition of the clinker, there is a specific mixture ratio between the limestone and the clay components. Thus the amount of fuel which can be used as low grade fuel in the form of fuel-bearing clay components is also determined. If this amount is insufficient for complete calcining of the ground limestone, the residual requirement is met by the addition of extra fuel.

With the method according to the invention this additional burner can be operated with fuel alone, without primary air.

The conduit leading from the rotary kiln to the preheater and also the gas speed in said conduit are of such dimensions in accordance with the invention that substantially all the material introduced into the conduit is entrained by the gas stream and carried to the lowest cyclone stage of the preheater. By increasing the gas speed in the lowermost part of the conduit leading from the rotary kiln to the preheater (e.g., by a constriction of the cross-section) one can ensure that scarcely any particles of material introduced into the conduit fall down through the conduit directly into the rotary kiln.

For complete combustion of the combustible fractions of the fuel-bearing components it is important for the gases in the conduit above the firing zone to be intensively mixed. For this purpose the conduit can be provided for instance with swirlplates or other structures suitable for mixing the gases.

Any additional burners provided are preferably disposed in the areas of the conduit perimeter not occupied by the material inlets.

One embodiment of plant for carrying out the method in accordance with the invention is shown in the drawing which is a schematic elevation of apparatus according to the invention.

This plant for the manufacture of cement clinker comprises a cyclone preheater 1 and a rotary kiln 2. The type of construction of the cyclone preheater 1 has no significance insofar as the present invention is concerned. In general it consists of a number of cyclone stages, of which only the two lowermost (cyclones 3 and 4) are represented. It will be understood that individual stages may also include a number of cyclones connected in parallel in known manner.

Ground limestone (arrow 5) is fed to the preheater 1 in a suitable, conventional manner and at a suitable position, for instance in the gas conduit leading to the uppermost cyclone, not shown. On passing through the separate cyclones in the preheater and the pipes which connect them, this ground limestone is heated and emerges through the material outlet pipe 6 of cyclone 4 of the second stage to enter via a pipe 7 at the lower part of the conduit 8 leading from the rotary kiln 2 to the cyclone 3.

The fuel-bearing components of the raw material (oil shale, bituminous limestone wash tailings) are also fed into the conduit 8 through a pipe 9, again in the lower part of the conduit. Combustion of the combustible parts of these components thus takes place in the conduit 8, and the already preheated ground limestone is largely calcined by the heat thus produced. Additional burners 10 may be provided in the conduit 8 to reinforce this neutralization process.

A fan 13 establishes a gas stream through the kiln 2 and upwardly (arrow 11) through the conduit 8 so that material fed into the conduit 8 at 7 and 9 is entrained and delivered to the inlet of the cyclone 3 by the exhaust gases from the rotary kiln 2. This material is separated out in the cyclone and thence passes through its outlet 12 into the rotary kiln 2.

What is claimed is:

1. A method of manufacturing cement clinker from limestone and clay components in a plant having a sintering kiln joined by a conduit to a multiple stage preheater having final and other interconnected stages, said method comprising introducing limestone components to a stage of said preheater other than said final stage; establishing via said conduit a stream of hot gases from said kiln to the final and other stages of said preheater to preheat said limestone components; introducing preheated limestone components from a stage of said preheater other than said final stage into said conduit; introducing fuel-bearing clay components into said conduit; combusting fuel in said fuel-bearing components in the presence of the preheated limestone components in said conduit to calcine the limestone and clay components; delivering the calcined limestone and clay components to the final stage of said preheater; discharging said calcined limestone and clay components from said final stage of said preheater to said kiln; and firing said calcined limestone and clay components in said kiln to form cement clinker.

2. A method according to claim 1 wherein said kiln is at a level lower than that of said final preheater stage and wherein said fuel-bearing clay components are introduced to said conduit at a level closer to said kiln than to said final preheater stage.

3. A method according to claim 1 including distributing said limestone components over the cross-sectional area of said conduit prior to the introduction to said conduit of said fuel-bearing clay components.

4. A method according to claim 3 wherein said fuel-bearing clay components are introduced to said conduit at a level above that at which said limestone components are introduced to said conduit.

5. A method according to claim 1 including forming said fuel-bearing clay components of a grain size such that the fuel is substantially completely burned in said conduit.

6. A method according to claim 1 including supplying to said conduit combustion air needed to combust the fuel in said fuel-bearing clay components exclusively from said kiln.

7. A method according to claim 1 including introducing said fuel-bearing clay components to said conduit in an amount sufficient to supply at least 30% of the heat required for calcining of said limestone components.

8. A method according to claim 7 including supplying to said conduit between said kiln and said final preheater stage additional fuel in an amount sufficient, together with the fuel in said fuel-bearing clay components, to generate sufficient heat to calcine said limestone components completely.

9. A method according to claim 8 wherein said additional fuel is introduced to said conduit in the absence of additional air.

10. A method according to claim 1 including maintaining said gas stream at such velocity with respect to the dimensions of said conduit and the quantity of limestone components introduced to said conduit that substantially all of such limestone components are entrained in said gas stream and delivered to said final preheater stage.

11. A method according to claim 10 including accelerating said gas stream in the region at which said limestone components are introduced to said conduit.

* * * * *